United States Patent
Spillner et al.

[11] Patent Number: 5,870,941
[45] Date of Patent: Feb. 16, 1999

[54] STEERING VALVE WITH CLOSED CENTER

[75] Inventors: Robert Spillner, Düsseldorf, Germany; Geoffrey Pritchard, Wrington, United Kingdom

[73] Assignee: TRW Fahrwerksysteme Gmbh & Co. KG, Dusseldorf, Germany

[21] Appl. No.: 875,504

[22] PCT Filed: Dec. 9, 1995

[86] PCT No.: PCT/EP95/04852

§ 371 Date: Nov. 17, 1997

§ 102(e) Date: Nov. 17, 1997

[87] PCT Pub. No.: WO97/21578

PCT Pub. Date: Jun. 19, 1997

[51] Int. Cl.$^6$ .................................................. B62D 5/083
[52] U.S. Cl. ............................................ 91/375 A; 91/389
[58] Field of Search ........................... 91/375 R, 375 A, 91/389; 137/625.24

[56] References Cited

U.S. PATENT DOCUMENTS

| | | | |
|---|---|---|---|
| 5,086,687 | 2/1992 | Elser et al. | 91/375 A |
| 5,107,752 | 4/1992 | Elser et al. | 91/375 A |
| 5,452,642 | 9/1995 | Dymond | 91/375 R |

FOREIGN PATENT DOCUMENTS

| | | |
|---|---|---|
| 2426201 | 12/1974 | Germany . |
| 2758321 | 7/1978 | Germany . |
| 2834421 | 2/1980 | Germany . |
| 4317818 | 7/1994 | Germany . |
| 4437168 | 2/1996 | Germany . |
| 8801959 | 3/1988 | WIPO . |

*Primary Examiner*—John E. Ryznic
*Attorney, Agent, or Firm*—Tarolli, Sundheim, Covell Tummino & Szabo

[57] ABSTRACT

The invention concerns a steering valve with a closed center for supplying an actuator with hydraulic pressure, the steering valve comprising an input shaft, and output shaft, a torsionally resilient element which is connected at one end to the input shaft and at the other end to the output shaft, a control pressure switching arrangement and a torque/axial force conversion unit. A spring loaded seat valve is located in a bore of the input shaft, and closes a fluid passage passing through the torsion tube. The torque/axial force convertor opens the seat valve when relative twisting of the input shaft with respect to the valve casing occurs. According to the invention, in order to improve the response dynamics of such a steering valve, the valve comprises at least one axial bore for supplying hydraulic pressure. At one end this bore is closed by a valve which is loaded by the torque/axial force conversion unit against the hydraulic pressure.

20 Claims, 3 Drawing Sheets

STEERING VALVE WITH CLOSED CENTER

BACKGROUND OF THE INVENTION

The invention pertains to a steering valve with a closed center for supplying a control element with hydraulic pressure, consisting of an input shaft, an output shaft, a torsionally elastic element that is connected at one end to the input shaft and at the other to the output shaft, a control pressure switching device and a torque/axial force converter unit.

Steering valves of this class are utilized in particular in power steering systems. The structure of such power steering systems is conventional. An input shaft connected to a steering linkage is connected to an output shaft equipped with a pinion. In a familiar manner, it is possible to insert a torsionally elastic element, a torsion rod, for instance, between the two shafts. The pinion acts on the toothed rack of a steering unit. The use of steering valves for such steering systems is familiar. For this purpose, a control pressure switching unit is provided, which may, for instance, be a valve casing engaged with the output shaft and surrounding the input shaft. Hydraulic fluid is pumped through the system with a pump. In case of a twisting of the input shaft relative the valve casing, hydraulic pressure is fed to a hydraulic motor, which assists the rack motion in one of the two possible directions.

Steering valves employed in power steering systems can be divided roughly into two groups. One type of steering valve employed in power steering systems is the steering valve with a so-called open center. In the neutral position of the steering valve with open center, hydraulic fluid at low pressure is pumped through the open valve into a reservoir by a pump. A twisting of the input shaft relative to the valve casing causes an elevation of the pressure, which is then fed to the servomotor. The disadvantage of steering valves with open centers is that a steady hydraulic flow must be maintained even in the neutral position. Thus, wasted power must be produced by the drive motor, derived primarily from the pressure accumulation and the volume flow.

Such a steering valve, which has all the features of this class, apart from the open center, is disclosed in DE 43 17 818 C1. A reaction piston with an electrohydraulic converter EHW is employed as a torque/axial force converter unit.

A power steering unit for passenger vehicles with a steering valve having an open center is known from DE 24 26 201 A1, wherein a hydraulic-bearing line is formed in the torsion element for purposes of minimizing the size of the unit, but not with regard to wear and tear on the seals.

Finally, DE 27 58 321 A1 discloses a steering valve with open center, in which an axial hole is drilled through the input shaft.

Another type of steering valve used in power steering systems is the steering valve with a so-called closed center. The hydraulic flow to the two cylinder sides is interrupted in the neutral position of the valve by the closed center position. Thus, there is no hydraulic flow in the neutral position. An operating pressure, which, upon opening of the valve only must be held within prescribed limits by the pump then going into action is applied to the practically closed valve by the pump. Because of the wasted power appearing for steering valves with open center even when the steering is not being operated, the steering valves with closed center are superior in the neutral position when considering power. They have the disadvantage, however, that practically no direct correlation exists between input torque and working pressure in the cylinder. In the prior art, therefore, additional measures were taken in order to provide the operator with a relationship between the steering force to be input and the resulting hydraulic pressure. Conventional seat valve arrangements are not without problems, since the seat valves undergo a certain wear and require considerable manufacturing and assembly effort. Moreover, they confront the operator with a threshold torque.

A steering valve of the generic class with a closed center is known from DE 28 34 421 A1. It has a torque/axial force converter unit and an axial borehole closed off by a seat valve for conducting hydraulic pressure. This additional seat valve not only increases the expense of manufacturing and assembly, it is also delicate and causes noise.

The special problem of steering valves with closed center with respect to the lack of a correlation between input torque and working pressure in the cylinder is expressed in steering initiation behavior, which is generally considered critical. Due to the fact that the hydraulic fluid is permanently present under maximum pressure at the control pressure switching device, a very high dynamism in the operation of the control pressure switching device results, since abrupt effects on system pressure occur.

Starting from this situation, the problem of the present invention is to improve a steering valve with closed center of the generic type such that its response dynamics are considerably improved, such that it can be made compact and reliable in its operation, and so that the steering valve can be simply and economically manufactured.

SUMMARY OF THE INVENTION

As a technical solution it is proposed that the steering valve have at least one axial borehole for conducting hydraulic pressure which is closed off at one end by a valve loaded against the hydraulic pressure by the torque/axial force converter unit.

The torque/axial force converter unit for steering valves with closed centers has the effect that a torque exerted via the input shaft against, for instance, a resilient element is converted into a variation of axial force. A valve loaded by the converter unit against the hydraulic pressure thus does not open abruptly, but as a function of the torque, of the spring characteristic of the resilient element and of the torque/axial force converter. It is thus possible to improve response behavior considerably by regulating the pressure.

The valve is advantageously a seat valve. Such a seat valve can bring about a complete sealing effect at one end of an axial borehole. Leakage losses can be almost completely avoided. The torque/axial force converter unit advantageously has a control slide. A control slide offers the possibility of loading the converter unit not only with the force of a resilient element, but also with appropriately guided hydraulic pressures. The control slide advantageously interacts with a spherical coupling to achieve a conversion between torque and axial force. According to a proposal of the invention, the spherical coupling interacts with a control slide interacting with the seat valve. The control slide is advantageously arranged in an axial borehole in the input shaft. Loading of the control slide by a helical spring is achieved by the design according to the invention. One of the halves of the spherical coupling is correspondingly loaded by way of the control slide. Balls are arranged between the two halves of the coupling, each equipped with universal ball joints, such that upon introduction of a torque, the force of the helical spring must first be overcome in order that the two halves of the ball coupling can move apart due to the balls pressing out of the depressions. Advantageously, the helical spring is also housed in the axial borehole arranged in the input shaft. By integrating the individual components of the converter unit into, for instance, axial boreholes in the input shaft, a compact construction of the steering valve is guaranteed.

It is advantageously proposed that the seat valve be arranged with axial play with respect to the reaction piston. The seat valve is arranged in an advantageous manner so as to be spring loaded in relation to the control slide. Thus the seat valve can perform movements relative to the control slide inside the axial play, independently of the valve position defined by torque hydraulic pressure relationships. After compensation for the play, the pressure regulation is interrupted by the rigid coupling and the maximum power assistance in the steering valve appears.

In an advantageous manner, a control space is formed in the axial borehole between the seat valve and the control slide. So long as the seat valve is closed, only tank pressure is present in the control space. Upon opening of the seat valve, a pressure which is fed via appropriate lines, boreholes and the like to a hydraulic motor builds up in the control space.

The control space is connected in an advantageous manner to radial boreholes. The control pressure switching unit advantageously also comprises a valve casing surrounding the input shaft, so that the radial boreholes lead from the control pressure into the area between input shaft and valve casing.

In an advantageous manner, the axial borehole is formed in a movable element of the power steering valve. According to a proposal of the invention, the axial borehole is guided axially through the output shaft. Guiding the borehole axially through the input shaft is also proposed. In order to avoid leakage losses and save on the height of the unit, it is also proposed to guide the axial borehole through the torsionally elastic element, which is practical to construct as a torsion rod.

The response dynamics of a steering valve with a closed center are considerably improved by the configuration according to the invention. For this purpose, an integrated pressure regulation system is proposed. By utilizing a seat valve interacting with an axial borehole, leakage losses in the neutral position of the valve are avoided. This yields a cost reduction in the manufacture of the valve since fewer components need be used than for conventional valves. By coupling the seat valve to the torque/axial force converter unit, a regulation of the cylinder pressure as a function of the angle of torsion of the input shaft results. This makes it possible to adjust the valve characteristic curve easily since the stiffness of the resilient element can be easily changed. For a helical spring inserted in an axial borehole into the input shaft, its spring deformation can be varied by adjusting the spring via an adjustment screw inserted into the borehole. The adjusting screw interacts with a seal. Moreover, the converter unit represents a centering device for finding the midpoint. The respective cutoff point of the valve characteristic curve can be adjusted by altering the free axial play between seat valve and control slide. The control slide in turn interacts with the spherical coupling.

By using a torsion tube, a hydraulic line accessible from the outside can be introduced through the torsion tube from the outer end into the output shaft as far as the input shaft. Seals that would otherwise be needed between input and output shaft are thus unnecessary, which brings about a decisive reduction of friction. The torsion tube is advantageously fastened in the output shaft at the touter end and is seated so that it can be twisted over a certain length into a borehole with an inner diameter enlarged with respect to the outer diameter. While the torsion rods are typically arranged inside the input shaft in conventional steering valves, [the input shaft] must have a minimum length in order to guarantee the torsion characteristic of the torsion rod. By the arrangement according to the invention of the torsion tube inside the output shaft, the input shaft can be correspondingly shortened. Therefore the steering valve according to the invention has a reduced constructive height with respect to conventional valves, which represents a special feature of the present invention.

Due to the freedom from leakage achieved by using the seat valve, the positive overlapping of the control edges can be reduced, whereby the dynamic properties of the valve are considerably improved. A special advantage of the valve according to the invention, finally, is that it is symmetrical on both control slides, that is, with respectively only one resilient element per steering side. Thus a sudden unilateral pressure buildup upon failure of the springs is out of the question.

BRIEF DESCRIPTION OF THE DRAWINGS

Additional advantages and characteristics of the invention are seen from the description below on the basis of the figures. These show in FIG. 1 a cross-sectional representation of an embodiment of the steering valve.

DETAILED DESCRIPTION OF THE INVENTION

Figure 1:
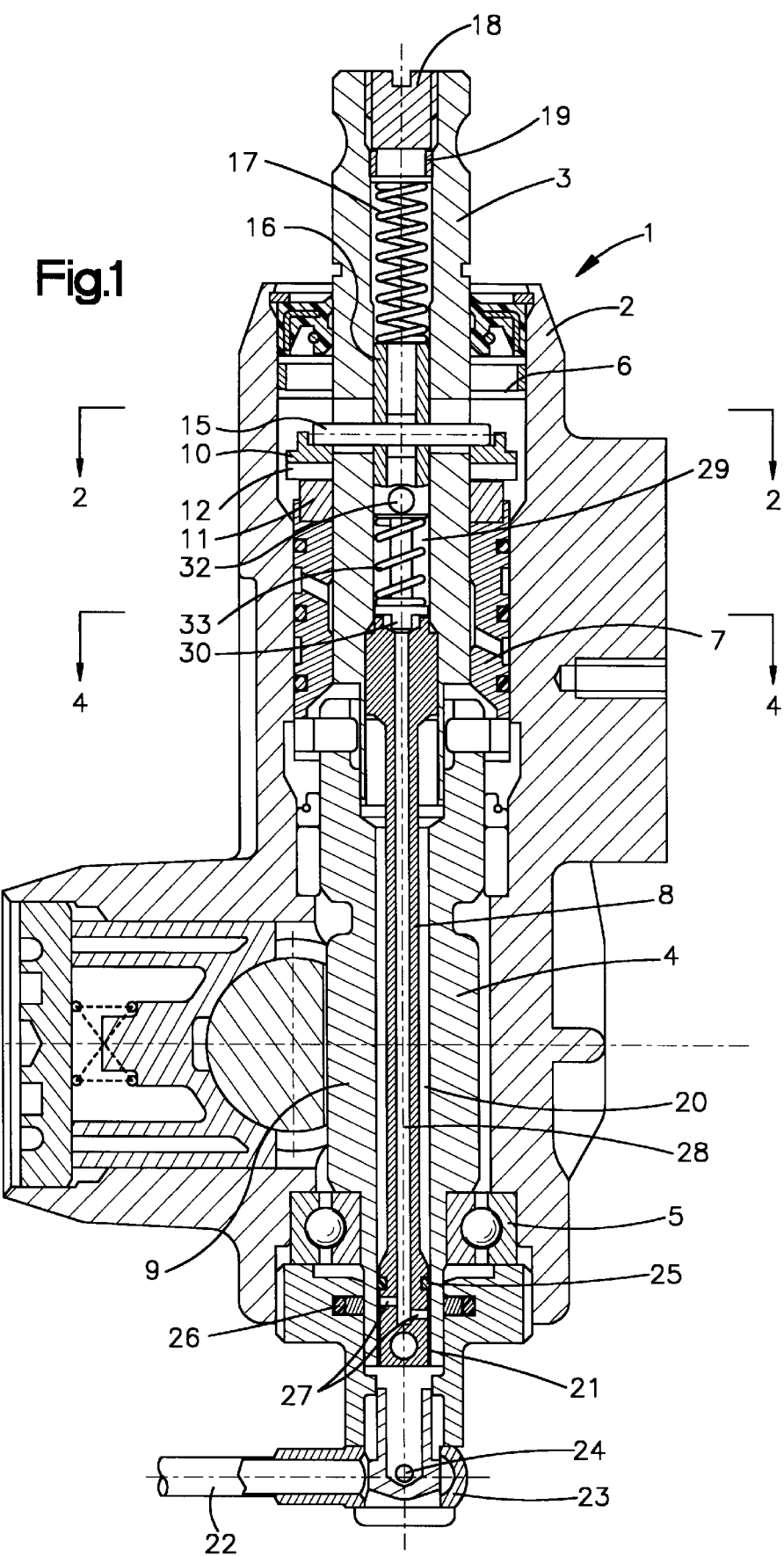

The steering valve 1 represented in the figures comprises a housing 2, into which an input shaft 3 and an output shaft 4 are inserted by way of bearings or seals 5,6. The input shaft 3 is enclosed by a valve casing 7. The valve casing is rigidly connected to the output shaft 4. The input shaft 3 is connected to the output shaft 4 via the torsion tube 8, so that relative movement between input shaft 3 and output shaft 4 and, thus valve casing 7 as well, can occur. The output shaft 4 is equipped with a pinion 9 which interacts with a rack of a steering system not shown in further detail.

Figure 2:
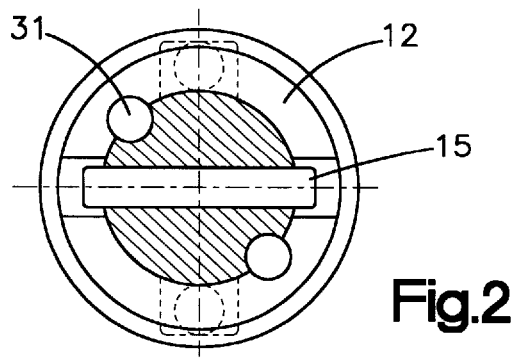
FIG. 2 a cross-sectional view along line A—A according to FIG. 1.
Figure 3:
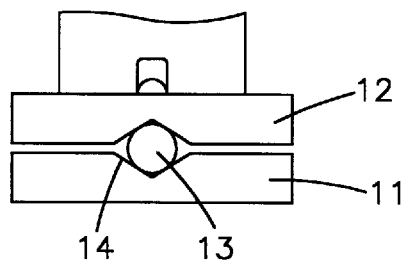
FIG. 3 a schematic side view of an embodiment of the torque/axial force converter.

A torque/axial force converter 10 is arranged in the vicinity of the upper end of the valve casing 7. As can be seen from FIGS. 2 and 3 as well, the converter consists of two coupling disks 11,12, in which so-called inclined planes 14 are formed into which balls 13 are inserted. If the one coupling disk is moved relative to the other, the balls 13, interacting with the inclined planes 14, cause the two coupling disks 11,12 to be moved apart axially. Depending on the spring load applied, a coupling is produced between the active torque and the axial movement. In the illustrated embodiment, the coupling disk 12 is connected to a pin 15 which in turn is axially movable in a radial borehole in the input shaft 3. The pin 15 is additionally connected to a control slide 16 arranged in a central axial borehole in the input shaft 3 so that it can be displaced axially together with the pin 15. The upper end of the control slide 16 is subjected to the action of a helical spring 17 which is arranged between a set screw 18 closing off the free end of the input shaft 3 and upper side of the control slide 16. Moreover, a seal 19 is arranged between the helical spring 17 and the set screw 18. The spring tension can thus be adjusted by way of the set screw 18.

The axial borehole 20, extending in the illustrated embodiment over the entire length of the steering valve 1 consists of the axial borehole 21, the axial borehole 28 in the torsion tube and the axial borehole 29 in the input shaft. A hydraulic line 22 brought in from the outside up to the steering valve 1 is connected via an annular articulated line 23 to the axial borehole 20. For this purpose a radial borehole 24 is formed in the annular line 23. The connector piece is arranged in the annular line 23. Seals 25,26 close off the lower connector region with respect to the housing interior and the axial borehole. The hydraulic pressure can thus be directed into the axial borehole 21 of the output shaft 4 in lowest area. Via radial boreholes 27 the pressure is additionally directed into the axial borehole 28 in the torsion tube 8. The pressure is directed through the axial borehole 28 in the torsion tube up to the upper free end.

In the embodiment illustrated the diameter of the torsion tube 8 is smaller than the internal diameter of the axial borehole 21 in the output shaft, with the exception of the attachment region, in which the seal 25 is also formed. The torsional elasticity of the torsion tube inside the output shaft can be achieved by these measures. In comparison to conventional valves, therefore, the input shaft can be considerably shortened, which is favorable to a shortening of the steering valve 1.

Figure 4:
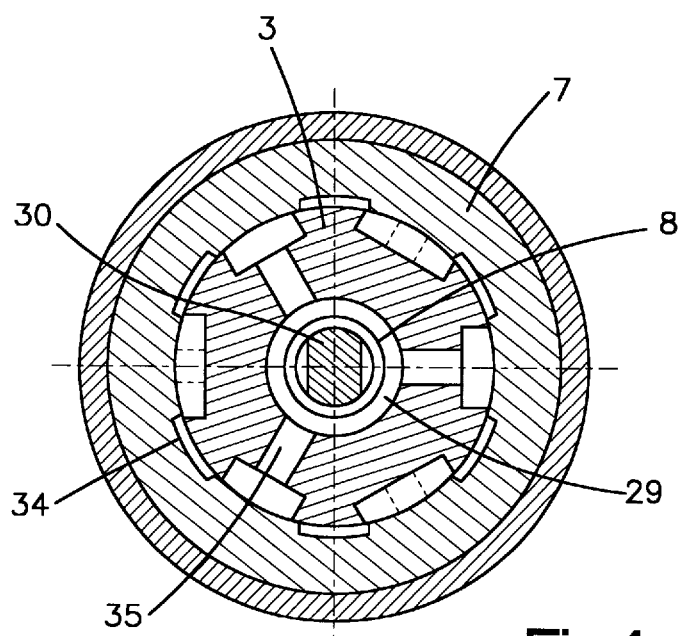
FIG. 4 a cross-sectional view along line B—B according to FIG. 1.

The free end of the torsion tube 8 is connected to the input shaft 3. For this purpose, the torsion tube is inserted into the axial borehole 29 in the input shaft 3. At the same time, a seat valve 30 that is resiliently coupled to the control slide 16 is arranged in axial borehole 29 in the input shaft 3. In the illustrated embodiment, the connection between the seat valve 30 and the control slide 16 consists in a fastener with axial play 32, so that the seat valve 30 can be moved axially relative to the control slide 16 within the scope of the play. Inside the play, the seat valve 30 is elastically coupled via the spring 33. The space between the lower end of the control slide 16 and the spring plate of the seat valve 30 is the so-called control space, which is connected via radial boreholes 35 to the control grooves 34 in the valve casing 7. This is best seen from the cross section in FIG. 4.

Considered in purely mechanical terms, the illustrated steering valve 1 functions in the following manner.

A torque acting on the input shaft 3 causes the coupling disk 12 of the torque/axial force converter 10 to be moved via the vertical balls, with the torque between the two coupling disks 11,12 opposing the force of the spring 17. Thus a middle centering is provided until the torque exceeds the force of the spring 17, such that a relative twisting can take place between the input shaft 3 and the output shaft 4, and thus the valve casing 7. The decisive factor here is the torsional rigidity of the torsion tube 8.

The following function occurs hydraulically.

As long as there is no steering, that is, as long as no torque is acting on the input shaft 3, the two piston sides of the control slide 16 are connected via the control boreholes to the tank, that is to say, they are at tank pressure. The seat valve 30 closes off the axial borehole 28 in the torsion tube free of leakage. This favors the formation of smaller positive overlaps in the vicinity of the control grooves, whereby the dynamic properties of the steering valve 1 are improved.

Upon introduction of a torque via the input shaft, the above-described middle centering of the valve, achieved primarily by the elastic force of the spring 17 and the converter 10, is overcome. Subsequently there is a relative twisting of the input shaft 3 with respect to the valve casing 7, and above the response threshold of the steering valve the seat valve 30 is opened by the reduction of the tension of the spring 33 and against the existing stored pressure. At the beginning of the opening process, a small volume flow flows into control space, in which the pressure now rises. The control pressure simultaneously corresponds as well to the back side of the seat valve and generates an axial force proportional to the surface area of the pressure hole and the control space pressure. The pressure increases until the seat valve again closes and the original closing force is achieved. This means that a control pressure is continuously adjusted, corresponding to a rotational movement of the input shaft into the cylinder, so that no discontinuities occur in the steering initiation range. The desired valve characteristic can be set by varying the stiffness of the spring 33. Diagrams are shown in FIG. 5 in which the changes of pressure are plotted as a function of torque.

Figure 5A:
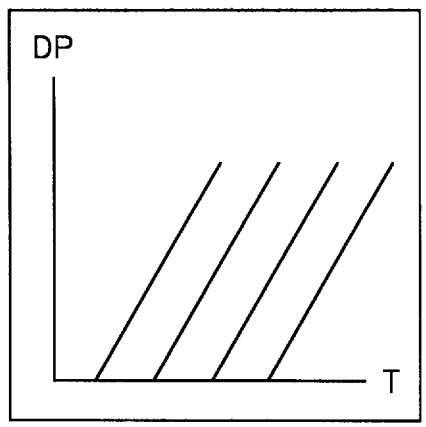
FIGS. 5a–5c diagrammatic representations of the valve characteristics settings.

The helical spring 17 can be varied with the set screw 18, whereby the middle centering shown in FIG. 5a can be displaced. The torque to be overcome, after which the seat valve 30 opens and changes in pressure can be achieved, can be adjusted according to the set initial tension of the spring 17.

Figure 5B:
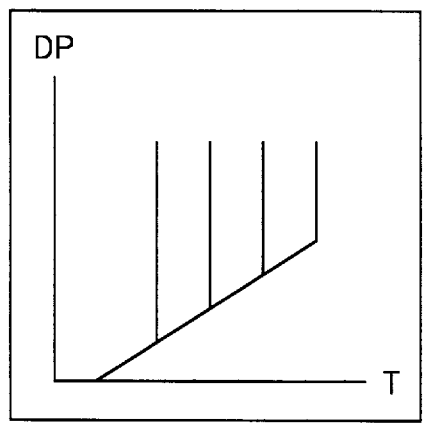
Figure 5C:
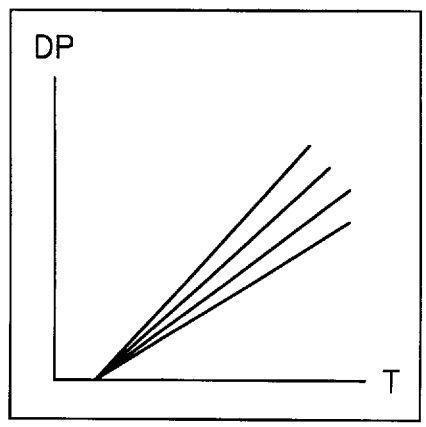

By variation of the spring stiffness of the spring 33 between control slide 16 and seat valve 30, the slope of the change in pressure can be adjusted according to FIG. 5c. The torque input by an operator here is proportional to the respective cylinder pressure. Thus steering behaviors can be achieved that correspond to steering valves with hydraulic feedback. The restoring force of the power steering becomes comparable to a purely mechanical steering system.

In the parking range, it is desirable that the maximum manual force be limited by the system. After compensating for the play between seat valve 30 and control slide 16, the coupling between the seat valve and the control slide becomes rigid. The so-called cut-off can be varied by variation of the play, as is shown in FIG. 5b. Upon reaching the respective setpoint, the pressure regulation is suppressed and the maximum system pressure builds up on the respective piston side.

The embodiment described above serves only to explain the invention, without limiting it to this embodiment form. In particular, the position of the axial boreholes and the coupling of the closure valve to the converter, as well as the embodiment of the converter, are variable within the scope of the invention.

| List of reference symbols | |
|---|---|
| 1 Steering valve | 20 Axial borehole |
| 2 Housing | 21 Axial borehole, output shaft |
| 3 Input shaft | 22 Hydraulic line |
| 4 Output shaft | 23 Annular line |
| 5 Bearing | 24 borehole |
| 6 Bearing | 25 Seal |
| 7 Valve casing | 26 Seal |
| 8 Torsion tube | 27 Radial borehole |
| 9 Pinion | 28 Axial borehole, output shaft |
| 10 Torque/axial force converter | 29 Axial borehole, input shaft |
| | 30 Seat valve |
| 11 Coupling disk | 31 Vertical balls |
| 12 Coupling disk | 32 Fastener with axial play |

-continued

List of reference symbols

| | | | |
|---|---|---|---|
| 13 | Balls | 33 | Spring |
| 14 | Inclined plane | 34 | Control grooves |
| 15 | Pin | 35 | Radial boreholes |
| 16 | Control slide | | |
| 17 | Helical spring | | |
| 18 | Set screw | | |
| 19 | Seal | | |

We claim:

1. Steering valve with closed center for supplying a control element with hydraulic pressure, consisting of an input shaft (3), an output shaft (4), a torsionally elastic element that is connected at one end to the input shaft and at the other to the output shaft, a control pressure switching device and a torque/axial force converter unit, characterized in that the steering valve (1) has at least one axial borehole (20) for carrying hydraulic pressure, which is closed at one end by a valve loaded by the torque/axial force converter unit (10) against the hydraulic pressure.

2. Steering valve according to claim 1, characterized in that the valve is a seat valve (30).

3. Steering valve according to claim 1, characterized in that the torque/axial force converter unit (10) has a control slide (16).

4. Steering valve according to claim 1, characterized in that the torque/axial force converter unit (10) comprises a spherical coupling.

5. Steering valve according to claim 1, characterized in that the torque/axial force converter unit is connected to a control slide (16).

6. Steering valve according to claim 5, characterized in that the control slide (16) is arranged in an axial borehole (29) in the input shaft (3).

7. Steering valve according to one of claim 5, characterized in that the control slide (16) is spring-loaded.

8. Steering valve according to claim 7, characterized in that a screw (17) is inserted into the axial borehole (29) of the input shaft (3) in order to spring-load the control slide (16).

9. Steering valve according to claim 1, characterized in that the valve (30) is arranged on the control slide (16) by means of a fastener with axial play.

10. Steering valve according to claim 9, characterized in that the valve (30) is spring-loaded opposite the control slide (16).

11. Steering valve according to claim 1, characterized in that a control space is formed in the vicinity of the valve (30) in the axial borehole (29) in the input shaft (3).

12. Steering valve according to claim 11, characterized in that the control space is connected to radial boreholes (35).

13. Steering valve according to claim 1, characterized in that the control space is connected to the control pressure switching device.

14. Steering valve according to claim 1, characterized in that the control pressure switching device comprises a valve casing (7).

15. Steering valve according to claim 1, characterized in that the axial borehole is formed in one of the moving elements of the steering valve (1).

16. Steering valve according to claim 1, characterized in that the axial borehole is led axially through the output shaft (4).

17. Steering valve according to claim 1, characterized in that the axial borehole is led through the input shaft (3).

18. Steering valve according to claim 1, characterized in that the axial borehole is led through the torsionally elastic element.

19. Steering valve according to claim 1, characterized in that the torsionally elastic element is arranged in an axial borehole (21) in the output shaft (4) over the greatest portion of its length.

20. Steering valve according to claim 1, characterized in that at least one of the spring elements is adjustable.

* * * * *